(12) United States Patent
Rumade et al.

(10) Patent No.: US 12,346,317 B2
(45) Date of Patent: Jul. 1, 2025

(54) SYSTEMS AND METHODS FOR PROVIDING A SEMANTIC QUERY FRAMEWORK

(71) Applicant: JPMORGAN CHASE BANK, N.A., New York, NY (US)

(72) Inventors: Anagha Rumade, Mountain View, CA (US); Anjana Umapathy, Santa Clara, NY (US); Sadra Amiri Moghadam, Mission San Jose, CA (US); Abhik Banerjee, Milpitas, CA (US); Gupta Gundlapalli, Frisco, TX (US); Jainesh Doshi, San Francisco, CA (US); Srinivasa Murthy Basavaraju, San Ramon, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/464,942

(22) Filed: Sep. 11, 2023

(65) Prior Publication Data
US 2025/0086170 A1    Mar. 13, 2025

(51) Int. Cl.
*G06F 16/242* (2019.01)
*G06F 16/22* (2019.01)
*G06F 16/334* (2025.01)

(52) U.S. Cl.
CPC ........ *G06F 16/243* (2019.01); *G06F 16/2237* (2019.01); *G06F 16/3347* (2019.01)

(58) Field of Classification Search
CPC . G06F 16/2237; G06F 16/3347; G06F 16/243
See application file for complete search history.

(56) References Cited

U.S. PATENT DOCUMENTS

| 11,704,318 | B1 * | 7/2023 | Keivanloo | ............. G06N 3/045 707/769 |
|---|---|---|---|---|
| 2020/0349181 | A1 * | 11/2020 | Carbune | ............... G06F 16/338 |
| 2020/0364233 | A1 * | 11/2020 | Chan | ................. G06F 16/24578 |
| 2022/0092099 | A1 * | 3/2022 | Bae | ........................... G06N 3/08 |

* cited by examiner

Primary Examiner — Charles D Adams
(74) Attorney, Agent, or Firm — GREENBERG TRAURIG LLP

(57) ABSTRACT

In some aspects, the techniques described herein relate to a method including: receiving, from a query interface, a natural language query; encoding the natural language query into tokens; embedding the tokens into a natural language query vector, wherein the natural language query vector represents a semantic meaning of the natural language query; formatting an index query of an index datastore, wherein the index query includes the natural language query vector as a lookup parameter of the index query; receiving, as a response to the index query, a document set; passing the document set and the natural language query to a machine learning model; receiving a response to the natural language query from the machine learning model, wherein the response is based on the document set; and providing the response to the natural language query to the query interface for consumption.

18 Claims, 3 Drawing Sheets

SYSTEMS AND METHODS FOR PROVIDING A SEMANTIC QUERY FRAMEWORK

BACKGROUND

1. Field of the Invention

Aspects generally relate to systems and methods for providing a semantic query framework.

2. Description of the Related Art

A semantic query allows users to format a query using natural language, such as an interrogatory sentence. This allows non-technical users to format queries easily and naturally and to take advantage of advances in machine learning techniques, such as interaction with robust large language models. Publicly available semantic query interfaces provide responses based on public data. Many enterprise-level organizations, however, maintain large private datasets and wish to incorporate these datasets into a semantic query framework, while at the same time providing access to query responses that may consider public data as well. Additionally, publicly available semantic query interfaces have a reputation for "hallucinations" and organizations have no way to verify that a response to a natural language query is factually accurate. Other concerns may include overall cost of using a publicly available natural language query interface, and an inability to format, or technical difficulty in formatting, a response that is relevant to users of a particular organization.

SUMMARY

In some aspects, the techniques described herein relate to a method including: receiving, from a query interface, a natural language query; encoding the natural language query into tokens; embedding the tokens into a natural language query vector, wherein the natural language query vector represents a semantic meaning of the natural language query; formatting an index query of an index datastore, wherein the index query includes the natural language query vector as a lookup parameter of the index query; receiving, as a response to the index query, a document set; passing the document set and the natural language query to a machine learning model; receiving a response to the natural language query from the machine learning model, wherein the response is based on the document set; and providing the response to the natural language query to the query interface for consumption.

In some aspects, the techniques described herein relate to a method, wherein the index query of the index datastore returns a set of document vectors based on a relative similarity of each document vector in the set of document vectors to the natural language query vector.

In some aspects, the techniques described herein relate to a method, wherein the relative similarity is based on a cosign similarity between each document vector in the set of document vectors to the natural language query vector.

In some aspects, the techniques described herein relate to a method, wherein each of document vector in the set of document vectors is related to a corresponding document in the document set.

In some aspects, the techniques described herein relate to a method, including: receiving an identification of documents used by the machine learning model to generate the response to the natural language query.

In some aspects, the techniques described herein relate to a method, including: comparing the identification of documents used by the machine learning model to generate the response to the natural language query to the document set.

In some aspects, the techniques described herein relate to a method, including: performing a self-critiquing process on the response to the natural language query, wherein the self-critiquing process is based on the response to the natural language query and the document set.

In some aspects, the techniques described herein relate to a system including at least one computer including a processor and a memory, wherein the at least one computer is configured to: receive, from a query interface, a natural language query; encode the natural language query into tokens; embed the tokens into a natural language query vector, wherein the natural language query vector represents a semantic meaning of the natural language query; format an index query of an index datastore, wherein the index query includes the natural language query vector as a lookup parameter of the index query; receive, as a response to the index query, a document set; pass the document set and the natural language query to a machine learning model; receive a response to the natural language query from the machine learning model, wherein the response is based on the document set; and provide the response to the natural language query to the query interface for consumption.

In some aspects, the techniques described herein relate to a system, wherein the index query of the index datastore returns a set of document vectors based on a relative similarity of each document vector in the set of document vectors to the natural language query vector.

In some aspects, the techniques described herein relate to a system, wherein the relative similarity is based on a cosign similarity between each document vector in the set of document vectors to the natural language query vector.

In some aspects, the techniques described herein relate to a system, wherein each of document vector in the set of document vectors is related to a corresponding document in the document set.

In some aspects, the techniques described herein relate to a system, wherein the at least one computer is configured to: receive an identification of documents used by the machine learning model to generate the response to the natural language query.

In some aspects, the techniques described herein relate to a system, wherein the at least one computer is configured to: compare the identification of documents used by the machine learning model to generate the response to the natural language query to the document set.

In some aspects, the techniques described herein relate to a system, wherein the at least one computer is configured to: perform a self-critiquing process on the response to the natural language query, wherein the self-critiquing process is based on the response to the natural language query and the document set.

In some aspects, the techniques described herein relate to a non-transitory computer readable storage medium, including instructions stored thereon, which instructions, when read and executed by one or more computer processors, cause the one or more computer processors to perform steps including: receiving, from a query interface, a natural language query; encoding the natural language query into tokens; embedding the tokens into a natural language query vector, wherein the natural language query vector represents a semantic meaning of the natural language query; formatting an index query of an index datastore, wherein the index query includes the natural language query vector as a lookup parameter of the index query; receiving, as a response to the index query, a document set; passing the document set and the natural language query to a machine learning model; receiving a response to the natural language query from the machine learning model, wherein the response is based on the document set; and providing the response to the natural language query to the query interface for consumption.

In some aspects, the techniques described herein relate to a non-transitory computer readable storage medium, wherein the index query of the index datastore returns a set of document vectors based on a relative similarity of each document vector in the set of document vectors to the natural language query vector.

In some aspects, the techniques described herein relate to a non-transitory computer readable storage medium, wherein the relative similarity is based on a cosign similarity between each document vector in the set of document vectors to the natural language query vector.

In some aspects, the techniques described herein relate to a non-transitory computer readable storage medium, wherein each of document vector in the set of document vectors is related to a corresponding document in the document set.

In some aspects, the techniques described herein relate to a non-transitory computer readable storage medium, including: receiving an identification of documents used by the machine learning model to generate the response to the natural language query.

In some aspects, the techniques described herein relate to a non-transitory computer readable storage medium, including: comparing the identification of documents used by the machine learning model to generate the response to the natural language query to the document set.

DETAILED DESCRIPTION

Figure 1:
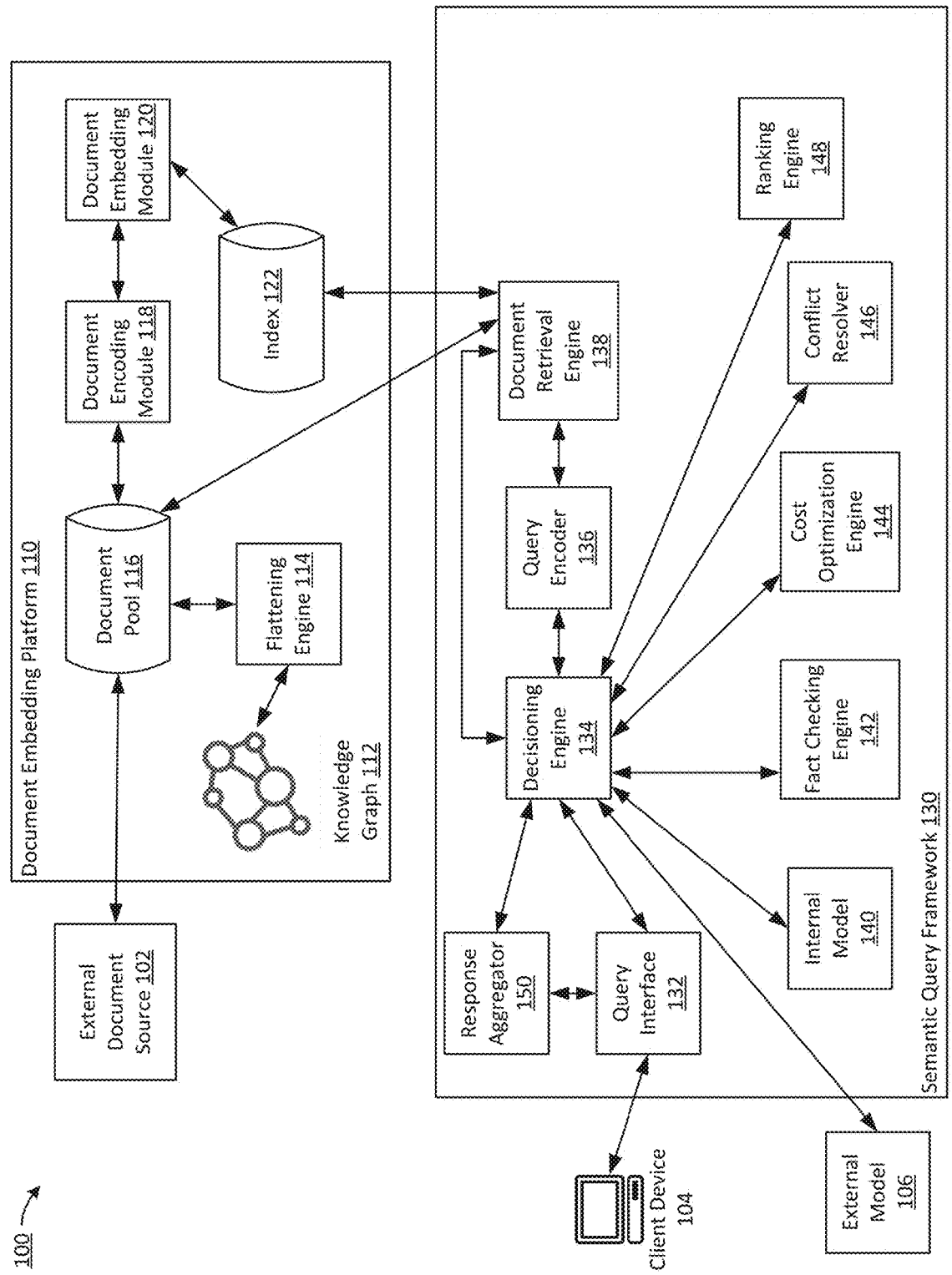
FIG. 1 is a block diagram of a system for providing a semantic query framework, in accordance with aspects.

Aspects generally relate to systems and methods for providing a semantic query framework.

Aspects may provide a natural language query interface that returns semantically relevant documents from sources both internal and external to an implementing organization and generates a response to a natural language query received at the interface based on the semantically relevant documents. A framework may combine relevant data from organizational data sources and publicly available data sources and process data with a machine learning (ML) model such as a large language model (LLM) to provide a query response based on relevant documents in a natural language format. Aspects may provide processes to eliminate or minimize factual errors (commonly known as "hallucinations") in a response to a natural language query, provide a prediction of a most cost-effective model to process a query, and provide a ranking engine to rank documents and document sources according to relevance. Output (e.g., query responses) from a framework may be in a structured and consumable format.

In accordance with aspects, a document pool may be maintained and may as input to a ML model. Documents in a document pool may include any form of unstructured data, such as word processor documents, portable document format (.pdf) documents, text (.txt) files, webpages (e.g., HTML format), etc. Documents may include text-based documents or image-based documents. A document pool may include documents from sources both internal and external to an implementing organization. For instance, a document pool may include documents from public sources such as the internet, commercial sources such as news or media organizations via, e.g., a subscription service, unstructured data from social media websites, etc. Additionally, documents may include unstructured data from an implementing organization's internal data sources. Internal data sources may include any data source from which data may be extracted into an unstructured format for inclusion in a document pool. Extraction processes may include formatting processes that transform extracted data into a document format for inclusion/storage in a document pool. A document pool may store documents in a document's native format (e.g., a word processor format, a .pdf format, a .txt format, etc.). A document pool may take any suitable electronic storage architecture, such as a data lake, a relational database, a data warehouse, or any other suitable datastore.

In accordance with aspects, a source of data for a document pool may be a graph database or knowledge graph maintained by an implementing organization. An organization may maintain a queryable knowledge graph that stores data in the form of nodes and edges. Knowledge graphs may reflect data points such as persons, organizations, etc., as nodes, and may include edges (connections between nodes) that represent relationships between the nodes. Nodes and edges may have properties that can be populated with values that describe the node or a relationship between two nodes. Aspects may provide a flattening process that takes a knowledge graph or graph database as input and flattens the nodes and edges into associated documents for inclusion in a document pool.

In accordance with aspects, a graph flattening process may include analyzing the structure of a graph to identify entities, properties, and their relationships with each other. For example, if a knowledge graph includes information about companies and the relationships between them, then key datapoints (e.g., graph nodes, and/or node properties) might include employees, departments, products, customers. Relationships (i.e., graph edges) might include "works for," "belongs to," "produces," "buys from," etc.

Once the key concepts and relationships within a knowledge graph have been identified, Natural Language Generation (NLG) techniques may be used to generate human-readable sentences that describe them. NLG involves using algorithms to convert structured data into natural language text. A combination of NLG techniques may be used to flatten a knowledge graph, including template-based approaches, rule-based approaches, and machine learning-based approaches.

In accordance with aspects, template-based approaches include using pre-defined templates to generate sentences based on the data in the knowledge graph. For example, a template for describing an employee might be: "Employee [name] works in the [department] department and has been with the company since [date]," where the bracketed words represent variables that may be replaced with graph data. Corresponding data from the knowledge graph may be queried using graph query languages and used to fill in the bracketed variables in a template.

In accordance with aspects, a rule-based approach to NLG involve using a set of rules to generate natural language sentences based on the data in the knowledge graph. An exemplary rule may be: "If an employee works in the sales department and has been with the company for more than five years, generate a sentence that says they are a senior sales executive."

In accordance with aspects, a machine learning-based approach may include providing the details of the entities and relationships as part of a prompt (i.e., input) to a large language model that has been trained to generate natural language text that can be used to describe the input portion of the knowledge graph. This technique may be used for portions of the knowledge graph for which templates and rules have not been created. A combination of template-based, rules-based, and ML-based NLG techniques may be used to generate natural language utterances/documents that are added to a document pool.

Aspects may include a document embedding framework that manages retrieval and formatting of documents included in a document pool and that generates document embeddings from documents in a document pool, which are a semantic representation of corresponding documents. Aspects of a document embedding framework may perform processing of documents for storage in a document pool or may perform pre-processing of documents stored in a document pool. For instance, text may be extracted from documents and formatted as a text file or a text string object. In some aspects, image-based documents may be processed with an optical character recognition (OCR) process in order to produce text from the image-based document. Extracted text may be stored in a document store as, e.g., a .txt file. In some aspects, extracted text may be read into a memory (such as a random access memory) as a text string object, either from a file or as it is extracted, and may be further processed by a document embedding framework.

FIG. 1 is a block diagram of a system for providing a semantic query framework, in accordance with aspects. System 100 includes document embedding platform 110. Document embedding platform 110 includes document pool 116. Document pool 116 may receive documents from external document source 102 and from internal document sources. An exemplary internal document source mat be knowledge graph 112. Other internal document sources (not shown in FIG. 1) may be any data source internal to an implementing organization, such as transactional systems, storage systems, systems of record (SoRs), or any suitable data source. Document embedding platform 110 may include flattening engine 114, may receive data in a graph format (i.e., nodes, edges, and associated properties), and may flatten the graph data into a document format that may be stored in document pool 116.

In accordance with aspects, a document embedding framework may include a document encoding module. A document encoding module may tokenize text included in a document. A tokenization process may process a text document into sub-portions of text included in a processed document. Each sub-portion may be a collection of one or more words, and may be referred to as a token, which may be used to analyze the text of a document. A tokenization process may split text on white space, may remove punctuation and stop words, and may retain, as tokens, terms that are useful in semantic ML evaluation of a document's contents. Token occurrences may be used as a vector that represents a document's semantic meaning.

Aspects of a document embedding framework may include a document embedding module that embeds tokens from a document into a vector associated with the document. A vector associated with a document may represent a semantic meaning of text included in a group of tokens generated from a tokenized document, and in turn, of the associated document, itself. Accordingly, a vector associated with a document may be used, mathematically, to determine a relative similarity between two or more documents. For instance, given several vectors associated with respective documents, two vectors that are relatively more similar in terms of cosign similarity will reflect a closer semantic similarity among the respective associated documents. That is, the more similar a document's vector representation is to another document, the closer these documents will be in terms of semantics (i.e., semantic data).

In accordance with aspects, document vectors may be stored in an indexed datastore (i.e., an "index"). A datastore may be indexed on a semantic category (e.g., on a column that stores normalized semantic category descriptions in its fields). An index so configured may provide highly efficient query results where the indexed datastore includes a high volume of documents (e.g., on the order of millions or tens of millions). Additionally, records in an index may include a relation, key, or other pointer to a document associated with a vector for retrieval of documents associated with vectors. In some aspects, a record may include a relational key or other identifier that may be used in a secondary query to retrieve a document from a document pool. In some aspects, a document may be stored in the index as a binary large object (BLOB) related to a record and may directly return an associated document as a response to a query of the index.

With additional reference to FIG. 1, document embedding platform 110 includes document encoding module 118, document embedding module 120, and index 122. Document encoding module 118 may encode documents from document pool 116 into one or more tokens. Document encoding module 118 may then send the one or more tokens to document embedding module 120. Document embedding module 120 may receive the tokens and may embed the received tokens in a vector that represents the meaning of a corresponding document. The vector may be stored in index 122, e.g., in a record as described in more detail herein. Index 122 may be indexed on one or more columns of the datastore as described in more detail, herein.

Aspects may further include a semantic query framework that may work in conjunction with a document embedding framework. A semantic query framework may execute instructions in real time (e.g., as a query is received at an interface of the framework) in order to provide a response to a received query. In accordance with aspects, a semantic query framework may include a query interface that accepts natural language queries and returns structured and consumable data based on documents stored in a document pool. A semantic query framework may include a decisioning module that receives, as input from a query interface, a natural language query and passes the natural language query and other related data/parameters to other processing modules in the semantic query framework. A decisioning module may receive output from the other processing modules. A decisioning engine may act as a coordinating service among various modules, engines, and other processing components of a semantic query interface.

In accordance with aspects, a decisioning module may pass a received natural language query to a query encoder as input to the query encoder. A query encoder may encode a query as one or more tokens and may embed the tokens as a vector that represents a semantic meaning of a natural language query. This process may be the same or similar to the process described above with respect to document encoding and embedding.

In accordance with aspects, a query encoder may generate a vector representation of a natural language (NL) query as output and pass the NL query vector to a document retrieval engine as input to the document retrieval engine. A document retrieval engine may include a NL query vector as a parameter of a generated query of an index datastore. That is, a document retrieval engine may generate a query for querying of an index datastore and pass a NL query vector received from a query encoder as a parameter of the generated query. The query may be configured to return document vectors that are similar to the NL query vector. A query may be configured to determine/return document vectors that are within a threshold or window of similarity, based on, e.g., cosign similarity between a NL query vector and a document vector.

In accordance with aspects, a query from a query engine may also retrieve documents associated with one or more returned document vectors. This may be done as a second query, e.g., to a document pool, or as part of an initial query of an index datastore. An initial query may be configured to return a lookup key of a document in a document pool, where the lookup key is related to, or contained in a same record as, a document vector that is determined to be similar to a NL query vector that is passed as a parameter of a query of the index. In some aspects, a lookup key (for example, a primary key) of a document record that holds or is associated with a document in a document pool may be used as a parameter in a secondary query of the document pool to return related documents. In other aspects, an index datastore may return related documents as part of an initial query. The index datastore may return documents stored as part of a record (e.g., as a BLOB). In still other aspects, a subquery may be executed (e.g., by the index datastore, another component of a document embedding framework, etc.) using document lookup keys returned in an initial query of an index datastore to retrieve related documents from a document pool.

In some aspects, documents received at a query engine may be culled to form a subset of documents returned from a query in order to meet a maximum or ceiling configuration with respect to a number of documents that may be returned to a decisioning engine as output from a query engine. Document ranking (discussed in more detail, below) may be used to determine a subset of documents returned to a decisioning engine.

With additional reference to FIG. 1, semantic query framework 130 includes decisioning engine 134, query interface 132, query encoder 136, and document retrieval engine 138. Query interface 132 receives natural language queries from client device 104. Query interface 132 passes the received NL queries to decisioning engine 134 and decisioning engine 134 sends the queries to query encoder 136. Query encoder 136 encodes the received NL queries into tokens and embeds the tokens in a NL query vector that represents the semantic meaning of the received NL query. This process of NL query tokenization and vector embedding may be the same or similar to document embedding described above with respect to a document encoding module and a document embedding module.

Query encoder 136 passes the NL query vector to document retrieval engine 138. Document retrieval engine 138 formats a query of index 122 using the NL query vector as a parameter of the query of index 122. Document retrieval engine 138 executes the query and receives a document set either from index 122 or from document pool 116 (or from both), in accordance with aspects described above. In addition to a document set, the query of index 122 may return additional information, such as a document identifier for each document returned by the query of index 122, and/or other relevant data from index 122 or from document pool 116. Document retrieval engine 138 sends the document set and other returned data to decisioning engine 134 for further processing.

In accordance with aspects, a query engine may return relevant documents and other data received in response to one or more queries to a decisioning engine. A decisioning engine may then provide or expose the received documents and a previously received NL query to a cost optimization engine. A cost optimization engine may determine, based on the received documents and a corresponding NL query, a ML learning model (e.g., a LLM) that may most effectively process the documents in terms of costs (e.g., processing resources, monetary costs, and other direct and/or indirect costs associated with processing a natural language query to produce a ML query response).

In accordance with aspects, a cost optimization engine may include a classifier ML model that takes a natural language query and one or more documents (i.e., the retrieved documents) as input, processes the input, and provides, as output, a prediction of a ML model that will most effectively (from a cost standpoint) process the input documents to provide a response to the input query. A classifier ML model may be a classification-based, supervised model. The model may be trained on historic queries and training output may be validated with a verified validation dataset. A cost optimization engine may provide a prediction of a most cost-effective ML model to process the natural language query using the provided documents. Aspects may provide a prediction or classification of a most cost effective LLM from a set of LLMs that an implementing organization provides or has access to. A set of models may include internal and/or proprietary models and external and/or commercial models.

A prediction or classification of a cost-effective model from a cost optimization engine may be passed to a decisioning engine and a decisioning engine may evaluate the prediction to determine a model (e.g., a LLM) to send a received natural language query to. For instance, a decisioning engine may include logic that evaluates a response from a cost optimization engine and, based on the response sends a received natural language query as a parameter included in a call to an exposed method of an application programming interface (API) of a corresponding ML model. In an exemplary aspect, a decisioning engine may receive an indication from a cost optimization engine that an internal LLM is a most cost-effective model to process a natural language query. Accordingly, a decisioning engine may make a method call to an exposed method of an API for the internal LLM, passing a received natural language query to the internal LLM as a parameter. In other exemplary aspects, a prediction from a cost optimization engine may indicate a public/commercial LLM model may be a most cost-effect model, and a decisioning engine may, in turn, pass a received NL query to the predicted public commercial model.

In addition to passing a NL query to a predicted model, a decisioning engine may also pass one or more documents (i.e., a document set) received as output from a query engine to a ML model. As with a NL query, a document set may also be passed to a ML model via an API interface/exposed method. An additional parameter passed with a NL query and a document set may be an indication or instruction for the receiving/evaluating model to evaluate and answer a received NL query in the context of the document set. That is, a decisioning engine may send a NL query, a document set, and an indication, instruction, or other parameter that instructs the receiving model to evaluate the NL query only in the context of the document set and to generate a response to the NL query based solely on the document set. After processing by, e.g., a LLM, and in response to the API call made from the decisioning engine, an evaluating model may respond to the decisioning engine with an answer to the passed NL query (i.e., an NL query response).

With continued reference to FIG. 1, decisioning engine 134 may pass a document set and a corresponding NL query to cost optimization engine 144. Cost optimization engine 144 may pass the document set and the NL query to a classifier model included in cost optimization engine 144 as input to the classifier model. The classifier model may process the document set and NL query and may output a prediction that classifies the received document set and corresponding NL query as most cost-effectively processed by one of a set of available models, such as LLMs. A prediction/classification of a most cost-effective model to answer the received query in the context of the received document set made by cost optimization engine 144 may be passed to decisioning engine 134.

Decisioning engine 134, in turn, may pass the document set and corresponding NL query for which the prediction/classification was made to a model (public or private) indicated by the prediction/classification. For instance, cost optimization engine 144 may predict that external model 106 is a most cost-effective model to process a received NL query and document set, and decisioning engine 134 may call an API method of external model 106 and pass the document set and NL query to external model 106 for processing. Conversely, cost optimization engine 144 may predict that internal model 140 may be the most-effective model for processing the document set and NL query, and decisioning engine 134 may pass the document set and NL query to internal model 140 for processing a response to the NL query.

In accordance with aspects, a semantic query framework may include a fact checking engine that evaluates a model's NL query response in order to detect factual errors in the model's response (commonly known as model "hallucinations"). A decisioning engine may request from a machine learning model, (e.g., may call an API method that is configured to return) identifications of documents that the model used in generating a response to a NL query. Along with a response to a query, an evaluating model may return document identifiers of corresponding documents that the model used in generating the response to the received query. In some aspects, the model may return, e.g., a lookup key, a primary key, etc. (i.e., document identifiers or identifications), of documents that correspond with documents retrieved from a document pool and sent to the model. In other aspects, the model may return actual documents that the model used in its response generation.

In accordance with aspects, a fact checking engine may be provided with a document set that was sent to a model along with a NL query. A fact checking engine may further be provided with documents or document identifications returned from an evaluating/responding model, where the returned documents and/or document identifications represent the documents that the model used in generating an answer to a received query. A fact checking engine may perform a comparison of the documents and/or document identifications to determine that the documents/document identifiers match the documents sent to the model along with the corresponding NL query. If the documents match, then the query may be accepted or passed to another verification process. If the documents do not match, then the query may be discarded and the NL query may be resubmitted with the appropriate parameters.

In accordance with aspects, a fact checking engine may also include a self-critiquing process for detection of factual errors. A self-critiquing process may include a second ML model (such as a second LLM) that is trained to predict whether a query response received from a first LLM model reflects semantic data of a document set, and/or a known format of documents included in a document set. For instance, a second, or "fact checking" model, may be trained to receive a query response and a document set as input and provide, as output, a score that predicts whether the received query response was generated from the documents in the received document set. A fact checking model may be trained using historic query responses and corresponding document sets and may be validated with a corresponding validation set.

An output score may be in the form of a sliding scale, e.g., from 0-1, where a score relatively closer to one end of the scale predicts that the received query response was generated from the received document set. Conversely, a score is relatively closer to an opposite end of the scale may predict that the query answer was not generated from the received document set. For instance, on a scale of 0-1, a score close to 1 (e.g., 0.89) may indicate that a received NL query was generated from a received document set. In some aspects, a threshold may be set, and any score that is over the set threshold may indicate that a received NL query response was generated from a received document set.

Referring to FIG. 1, decisioning engine 134 may receive a NL query response and data indicating a document set used in generating the NL query response from, e.g., internal model 140 or external model 106. Decisioning engine 134 may pass the NL query response and data indicating a document set used in generating the NL query response to fact checking engine 142. Additionally, decisioning engine 134 may pass a document set and or document identifiers received from document retrieval engine 138 to fact checking engine 142. Fact checking engine 142 may perform a comparison of data indicating a document set used in generating the NL query response and the document set and or document identifiers received from document retrieval engine 138 to verify that the responding model used only the documents provided in the document set. Moreover, fact checking engine 142 may perform a self-critiquing process (as described in further detail, herein) to further verify that the NL query response was generated based solely on the document set provided by decisioning engine 134 to the responding model.

In accordance with aspects, a conflict resolver may execute logic to resolve any conflicts that are found in a response to an NL query. Documents in a document pool may be identified as either internal or external documents (i.e., documents that are retrieved or generated from internal organizational data, or documents that have been retrieved from external sources, such as from the internet). In the event of a data conflict between data from an internal document and an external document, data from the internal document may be given priority and may be kept in, or used in, a final query response. Conflicting data from an external source may be discarded.

In accordance with aspects, a ranking engine may rank both a document's source and the document itself. The ranking may be in the form of a rank score, and the rank score may be used to determine relevant documents to be included for generation of a NL query response (e.g., to be included in a document set, by a query engine or other component/module of a semantic query framework). A rank score may be determined based on an amount of data and/or a type of data in a document that is used to generate a NL query response.

In accordance with aspects, a response aggregator may format a NL query response into a format that is displayed by a query interface. A response aggregator may arrange a NL query response into a structured and consumable format. For instance, a response aggregator may populate fields of a response form that is displayed by a query interface, may facilitate exporting of query results, may format links (such as hyperlinks) to documents from a document pool used to generate the response, etc.

With additional reference to FIG. 1, conflict resolver 146 may perform conflict resolution on NL query responses as described herein. Additionally, ranking engine 148 may execute a document ranking process as described herein. Once a NL query response has been processed by conflict resolver 146, the output may be passed to decisioning engine 134 as a final NL query response. Decisioning engine 134 may pass the final NL query response to response aggregator 150. Response aggregator 150 may parse the response and format the response for display by query interface 132. The response may be formatted in a structured and consumable format, as described herein, and may be presented for consumption by a user of client device 104.

Figure 2:
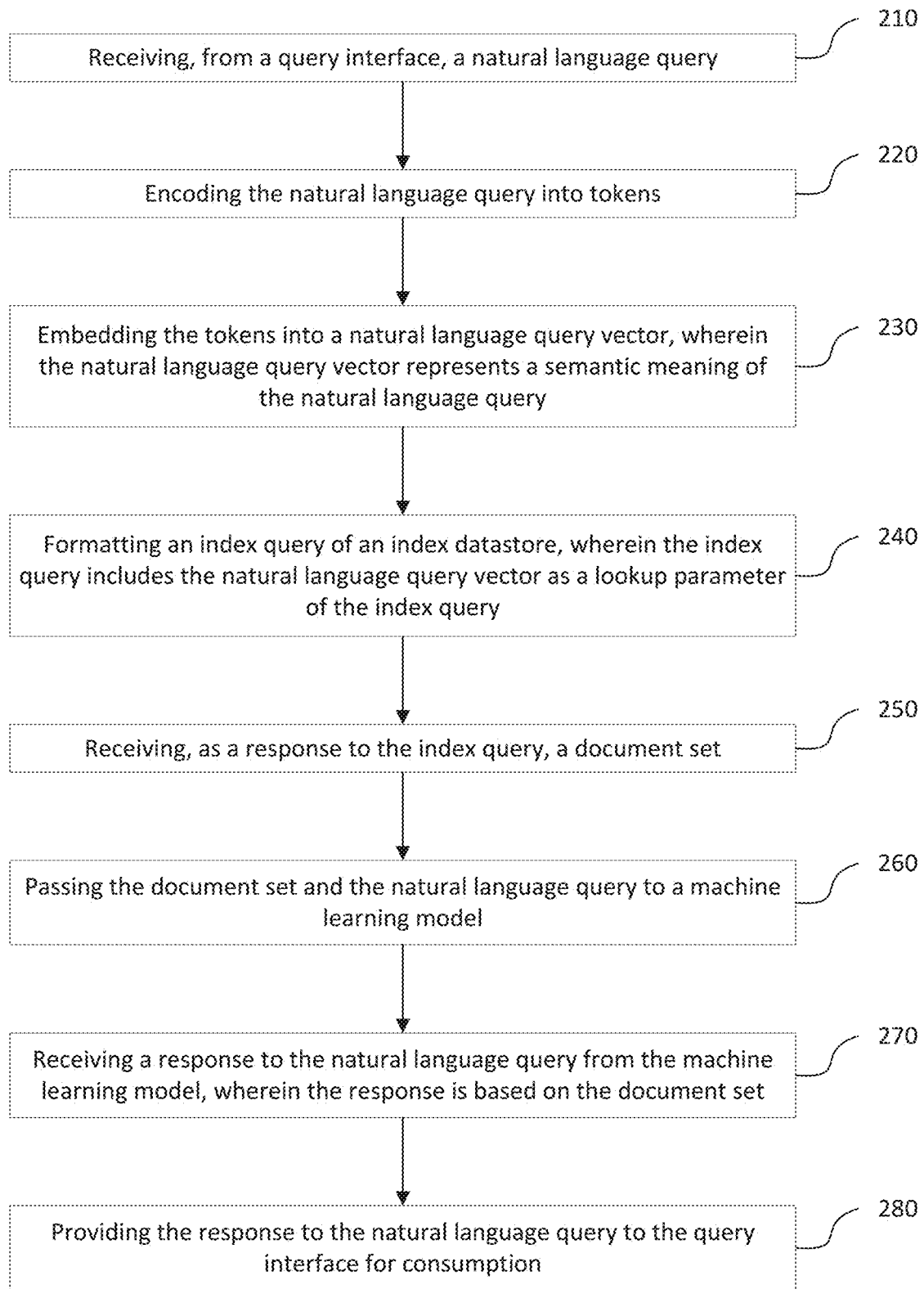
FIG. 2 is a logical flow for providing a semantic query framework, in accordance with aspects.

FIG. 2 is a logical flow for providing a semantic query framework, in accordance with aspects.

Step 210 includes receiving, from a query interface, a natural language query.

Step 220 includes receiving, from a query interface, a natural language query encoding the natural language query into tokens.

Step 230 includes embedding the tokens into a natural language query vector, wherein the natural language query vector represents a semantic meaning of the natural language query.

Step 240 includes formatting an index query of an index datastore, wherein the index query includes the natural language query vector as a lookup parameter of the index query.

Step 250 includes receiving, as a response to the index query, a document set.

Step 260 includes passing the document set and the natural language query to a machine learning model.

Step 270 includes receiving a response to the natural language query from the machine learning model, wherein the response is based on the document set.

Step 280 includes providing the response to the natural language query to the query interface for consumption.

Figure 3:
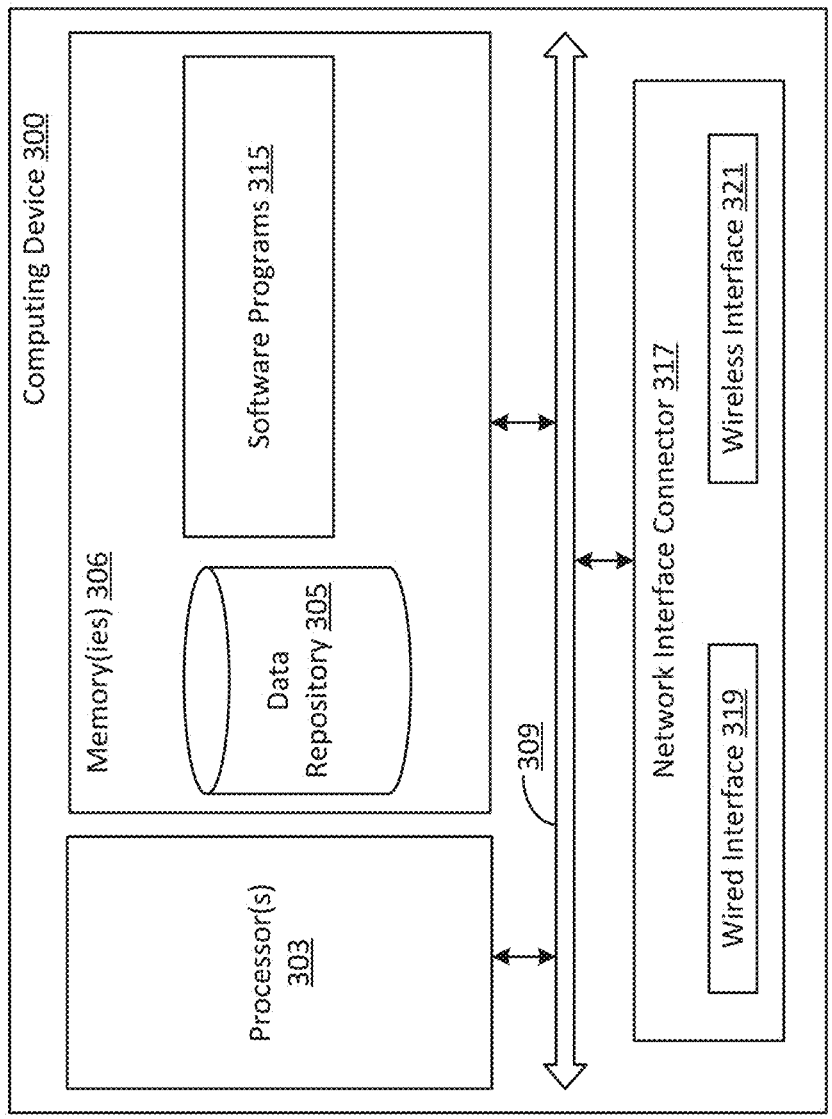
FIG. 3 is a block diagram of a computing device for implementing certain aspects of the present disclosure.

FIG. 3 is a block diagram of a computing device for implementing certain aspects of the present disclosure. FIG. 3 depicts exemplary computing device 300. Computing device 300 may represent hardware that executes the logic that drives the various system components described herein. For example, system components such as a flattening engine, a document encoding module, a document embedding module, a decisioning engine, a query encoder, a document retrieval engine, internal and external machine learning models, a cost optimization engine, a conflict resolver, a ranking engine, an interface, a document pool, an indexed data stored, various database engines and database servers, and other computer applications and logic may include, and/or execute on, components and configurations like, or similar to, computing device 300.

Computing device 300 includes a processor 303 coupled to a memory 306. Memory 306 may include volatile memory and/or persistent memory. The processor 303 executes computer-executable program code stored in memory 306, such as software programs 315. Software programs 315 may include one or more of the logical steps disclosed herein as a programmatic instruction, which can be executed by processor 303. Memory 306 may also include data repository 305, which may be nonvolatile memory for data persistence. The processor 303 and the memory 306 may be coupled by a bus 309. In some examples, the bus 309 may also be coupled to one or more network interface connectors 317, such as wired network interface 319, and/or wireless network interface 321. Computing device 300 may also have user interface components, such as a screen for displaying graphical user interfaces and receiving input from the user, a mouse, a keyboard and/or other input/output components (not shown).

The various processing steps, logical steps, and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing machine" a "computing device," an "electronic device," a "mobile device," etc. These may be a computer, a computer server, a host machine, etc. As used herein, the term "processing machine," "computing device, "electronic device," or the like is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular step, steps, task, or tasks, such as those steps/tasks described above. Such a set of instructions for performing a particular task may be characterized herein as an application, computer application, program, software program, or simply software. In one aspect, the processing machine may be or include a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

The processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:
   receiving, from a query interface, a natural language query;
   receiving, from an external document source and at a document pool of a document embedding platform, an external document comprising external data;
   receiving, from an internal document source and at the document pool, a knowledge graph comprising internal data;
   flattening, by a flattening engine of the document embedding platform, the knowledge graph into graph data in a document format and storing the document format in the document pool;
   encoding, by a document encoding module of the document embedding platform, the text of the document pool into tokens that represent sub-portions of the text;
   embedding, by a document embedding module of the document embedding platform, the tokens into a natural language query vector, wherein the natural language query vector represents a semantic meaning of one or more documents of the document pool;
   formatting, by an index query of an index datastore of the document embedding platform, wherein the index query includes the natural language query vector as a lookup parameter of the index query;
   storing, as a response to the index query at the index datastore, a document set as a binary large object including a relation to another associated document;
   encoding, by a query encoder of a semantic query framework, the natural language query into tokens that represent sub-portions of the natural language query;
   generating, by a machine learning model of the semantic query framework, a response to the natural language query based on the document set;
   generating, by a fact checking engine of the semantic query framework, a comparison of the response and the document set;
   passing, by the document pool or the index datastore, the document set to the machine learning model based on the relation and the index query;
   resolve conflicts, by a conflict resolver of the semantic query framework, by selecting internal data for the response where internal data included in the response conflicts with external data in the response;
   removing, by the conflict resolver, the external data from the response; and
   displaying, by a query interface of the semantic query framework, the response.

2. The method of claim 1, wherein the index query of the index datastore returns a set of document vectors based on a relative similarity of each document vector in the set of document vectors to the natural language query vector.

3. The method of claim 2, wherein the relative similarity is based on a cosign similarity between each document vector in the set of document vectors to the natural language query vector.

4. The method of claim 3, wherein each document vector in the set of document vectors is related to a corresponding document in the document set.

5. The method of claim 1, comprising:
   receiving an identification of documents used by the machine learning model to generate the response to the natural language query.

6. The method of claim 5, comprising:
   comparing the identification of documents used by the machine learning model to generate the response to the natural language query to the document set.

7. A system comprising at least one computer including a processor and a memory, wherein the at least one computer is configured to:
   receive, from a query interface, a natural language query;
   receive, from an external document source and at a document pool of a document embedding platform, an external document comprising external data;

receive, from an internal document source and at the document pool, a knowledge graph comprising internal data;

flatten, by a flattening engine of the document embedding platform, the knowledge graph into graph data in a document format and storing the document format in the document pool;

encode, by a document encoding module of the document embedding platform, the text of the document pool into tokens that represent sub-portions of the text;

embed, by a document embedding module of the document embedding platform, the tokens into a natural language query vector, wherein the natural language query vector represents a semantic meaning of one or more documents of the document pool;

format, by an index query of an index datastore of the document embedding platform, wherein the index query includes the natural language query vector as a lookup parameter of the index query;

store, as a response to the index query at the index datastore, a document set as a binary large object including a relation to another associated document;

encode, by a query encoder of a semantic query framework, the natural language query into tokens that represent sub-portions of the natural language query;

generate, by a machine learning model of the semantic query framework, a response to the natural language query based on the document set;

generate, by a fact checking engine of the semantic query framework, a comparison of the response and the document set;

passing, by the document pool or the index datastore, the document set to the machine learning model based on the relation and the index query;

resolve conflicts, by a conflict resolver of the semantic query framework, by selecting internal data for the response where internal data included in the response conflicts with external data in the response;

removing, by the conflict resolver, the external data from the response; and display, by a query interface of the semantic query framework, the response.

8. The system of claim 7, wherein the index query of the index datastore returns a set of document vectors based on a relative similarity of each document vector in the set of document vectors to the natural language query vector.

9. The system of claim 8, wherein the relative similarity is based on a cosign similarity between each document vector in the set of document vectors to the natural language query vector.

10. The system of claim 9, wherein each document vector in the set of document vectors is related to a corresponding document in the document set.

11. The system of claim 7, wherein the at least one computer is configured to:
receive an identification of documents used by the machine learning model to generate the response to the natural language query.

12. The system of claim 11, wherein the at least one computer is configured to:
compare the identification of documents used by the machine learning model to generate the response to the natural language query to the document set.

13. A non-transitory computer readable storage medium, including instructions stored thereon, which instructions, when read and executed by one or more computer processors, cause the one or more computer processors to perform steps comprising:

receiving, from a query interface, a natural language query;

receiving, from an external document source and at a document pool of a document embedding platform, an external document comprising external data;

receiving, from an internal document source and at the document pool, a knowledge graph comprising internal data;

flattening, by a flattening engine of the document embedding platform, the knowledge graph into graph data in a document format and storing the document format in the document pool;

encoding, by a document encoding module of the document embedding platform, the text of the document pool into tokens that represent sub-portions of the text;

embedding, by a document embedding module of the document embedding platform, the tokens into a natural language query vector, wherein the natural language query vector represents a semantic meaning of one or more documents of the document pool;

formatting, by an index query of an index datastore of the document embedding platform, wherein the index query includes the natural language query vector as a lookup parameter of the index query;

storing, as a response to the index query at the index datastore, a document set as a binary large object including a relation to another associated document;

encoding, by a query encoder of a semantic query framework, the natural language query into tokens that represent sub-portions of the natural language query;

generating, by a machine learning model of the semantic query framework, a response to the natural language query based on the document set;

generating, by a fact checking engine of the semantic query framework, a comparison of the response and the document set;

passing, by the document pool or the index datastore, the document set to the machine learning model based on the relation and the index query;

resolve conflicts, by a conflict resolver of the semantic query framework, by selecting internal data for the response where internal data included in the response conflicts with external data in the response;

removing, by the conflict resolver, the external data from the response; and displaying, by a query interface of the semantic query framework, the response.

14. The non-transitory computer readable storage medium of claim 13, wherein the index query of the index datastore returns a set of document vectors based on a relative similarity of each document vector in the set of document vectors to the natural language query vector.

15. The non-transitory computer readable storage medium of claim 14, wherein the relative similarity is based on a cosign similarity between each document vector in the set of document vectors to the natural language query vector.

16. The non-transitory computer readable storage medium of claim 15, wherein each document vector in the set of document vectors is related to a corresponding document in the document set.

17. The non-transitory computer readable storage medium of claim 13, comprising:

receiving an identification of documents used by the machine learning model to generate the response to the natural language query.

18. The non-transitory computer readable storage medium of claim 17, comprising:
comparing the identification of documents used by the machine learning model to generate the response to the natural language query to the document set.

\* \* \* \* \*